UNITED STATES PATENT OFFICE.

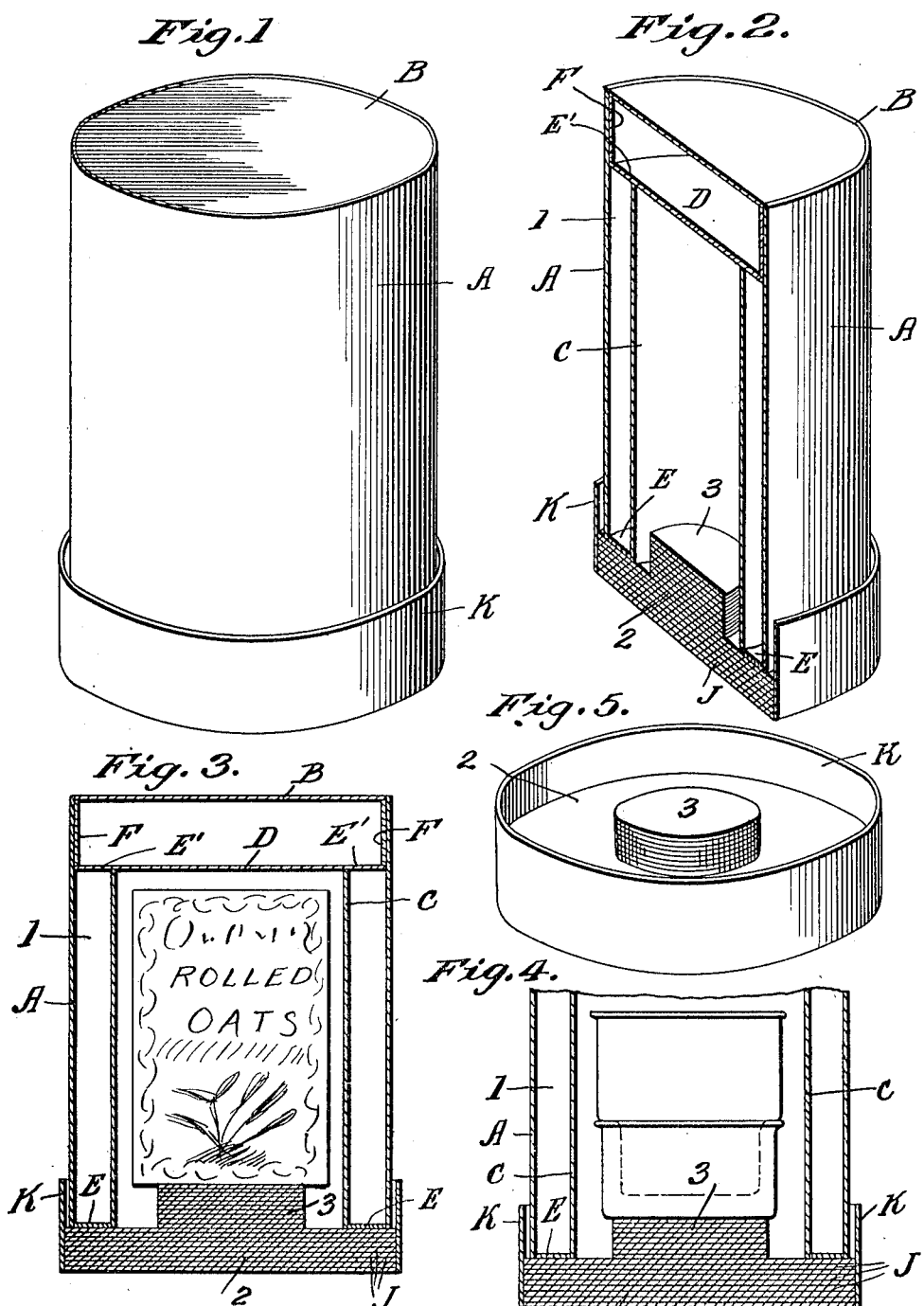

HUGO MOCK, OF NEW YORK, N. Y.

CONTAINER.

1,273,646.

Specification of Letters Patent.

Patented July 23, 1918.

Application filed January 14, 1918. Serial No. 211,740.

*To all whom it may concern:*

Be it known that I, HUGO MOCK, a citizen of the United States of America, residing in New York, county of New York, and State of New York, have invented certain new and useful Improvements in Containers; and I do hereby declare the following to be a full, clear, and exact description of the invention, such as will enable others skilled in the art to which it appertains to make and use the same.

This invention relates to containers and has for its object the provision of a container for shipping purposes which will at the same time be useful as a fireless cooker.

My especial object is to provide a container for packages of cereal which will be useful also as a fireless cooker for cereals but which container will be useful for shipping purposes for a package of cereal or for other purposes.

Another object of my invention is to produce a combination shipping container and fireless cooker of inexpensive materials and for this purpose I propose to employ in this container corrugated paper or similar materials as the materials out of which the container shall be constructed.

In the drawings,

Figure 1 represents a perspective view of the container and base in position,

Fig. 2 represents a perspective view partly in section of the container,

Fig. 3 represents the container with a package of cereal positioned therein,

Fig. 4 represents the container with a cooking vessel in place therein,

Fig. 5 is a perspective view of the base of the container.

1 represents the cover of the container, 2 the base thereof.

A is the outer shell made of corrugated paper with the top B. C represents the inner shell of the container with the top D, shells A and C being connected by the circular corrugated members E and E', the corrugated member E' being merely a continuation of the top D, D and E' being made of one sheet of corrugated paper. In order to lend additional strength to the container, a circular reinforcement F is inserted in the top of the container between the covers B and D. The base 2 comprises a number of sheets of corrugated paper J of equal size inclosed within the circular outer member K, the upper part of which extends for some distance above the rim E. The base 2 is purposely made somewhat larger than the cover 1 so that the cover 1 may be inserted with said base without binding. Upon the base 2 is placed an auxiliary stand 3 made of a number of sheets of corrugated paper, said stand having a diameter considerably less than the base 2 upon which a cooking utensil may be positioned. By placing the stand 3 in the center of the base, the cooking utensil is naturally placed in the center of the base and so is an equal distance from the walls of the cover 1 without touching same.

In use as a shipping case, appropriate means may be used to fit the base 2 upon the cover 1 as by inserting a few strips of paper between the outer casing K and the shell of the cover A. The closure for said container is purposely at the bottom and not at the top thereof, for the reason that when used as a fireless cooker it is desirable that the upper portion of the cooker be tightly sealed rather than the lower, as the hot air in the cooker ascends to the top thereof and remains confined therein. The air spaces between the walls A and C and D and B effectually prevent conduction of heat and radiation of heat between said walls and may be greatly lessened by covering said walls externally or internally or on both sides, with tinfoil or aluminum foil or any other thin sheet metal having a bright surface.

The base 2 with the stand 3 acts as an effectual non-conductor of heat for any cooking utensil placed thereon and the circulation of air between the inside of said cooker and the outside is effectually lessened by the upper lip of the rim K.

A further advantage of having the closure for said container at the bottom instead of at the top is that the weight of the cooking vessel, when the container is used as a fireless cooker, is on the base which is adapted to support the same, rather than on the paper elements D, E' and B.

What I claim is:—

1. A combined container and fireless cooker, the same comprising a body portion of concentric paper cylinders of unequal diameter closed at the top and fitting one within the other to provide a closed air space at the top and around the body of said container, a base for said container serving as the closure therefor and made larger than the body of the container and having a rim encircling said base to loosely inclose the body portion of the container, a rim closing the space between said cylinders at the bottom and resting upon said base, said base being composed of a plurality of layers of paper, and a centrally disposed stand of a plurality of layers of paper mounted on said base and of materially less diameter than that of the inner cylinder.

2. As an improved article of manufacture, a combined container and fireless cooker, the same embodying concentric paper cylinders of unequal diameter and one of greater length than the other, a top resting upon the inner cylinder and closing the space between said cylinders at such end, a top at the end of the outer cylinder, leaving a space between said tops, a circular reinforce in said space between the inner and outer tops, and a bottom closure forming a support for the device when used as a cooker.

3. As an improved article of manufacture, a combined container and fireless cooker, the same embodying concentric paper cylinders of unequal diameter and one of greater length than the other, a top resting upon the inner cylinder and closing the space between said cylinders at such end, a top at the end of the outer cylinder, leaving a space between said tops, a circular reinforce in said space between the inner and outer tops, an annular rim closing the lower end of the space between the cylinders, a base formed of a plurality of layers of paper and forming the closure for said container, a circular member embracing said base and extended above said annular rim, and a stand disposed centrally of the inner cylinder and formed of a plurality of layers of paper mounted upon said base and of materially less diameter than that of the inner cylinder.

In testimony whereof I affix my signature.

HUGO MOCK.

Copies of this patent may be obtained for five cents each, by addressing the "Commissioner of Patents, Washington, D. C."